United States Patent
Fowler et al.

(10) Patent No.: US 9,090,158 B2
(45) Date of Patent: Jul. 28, 2015

(54) SUPPORT FOR VERTICALLY MOUNTED EXHAUST COMPONENTS

(75) Inventors: Arthur Nalson Fowler, Winston-Salem, NC (US); Robert Renie Brewer, High Point, NC (US)

(73) Assignee: VOLVO GROUP NORTH AMERICA, LLC, Greensboro, NC (US)

(*) Notice: Subject to any disclaimer, the term of this patent is extended or adjusted under 35 U.S.C. 154(b) by 979 days.

(21) Appl. No.: 13/258,704

(22) PCT Filed: Mar. 24, 2009

(86) PCT No.: PCT/US2009/001825
§ 371 (c)(1),
(2), (4) Date: Sep. 22, 2011

(87) PCT Pub. No.: WO2010/110769
PCT Pub. Date: Sep. 30, 2010

(65) Prior Publication Data
US 2012/0012733 A1    Jan. 19, 2012

(51) Int. Cl.
*A47B 97/00* (2006.01)
*B60K 13/04* (2006.01)
*F01N 13/18* (2010.01)

(52) U.S. Cl.
CPC ............ *B60K 13/04* (2013.01); *F01N 13/1822* (2013.01)

(58) Field of Classification Search
CPC .............................. B60K 13/04; F01N 13/1822
USPC ............. 248/154, 231.21, 311.2, 313, 316.1, 248/316.5, 316.8, 503, 505, 231.71; 180/89.2, 296, 309; 181/227, 243, 256, 181/272, 282
See application file for complete search history.

(56) References Cited

U.S. PATENT DOCUMENTS

| | | | |
|---|---|---|---|
| 2,459,918 A | 1/1949 | Chester |
| 4,343,374 A | 8/1982 | Hollandsworth |
| 4,419,113 A | 12/1983 | Smith |
| 4,907,666 A | 3/1990 | Tecco |
| 5,328,209 A | 7/1994 | Cromwell |
| 5,570,861 A | 11/1996 | Olsen et al. |
| 5,649,685 A | 7/1997 | Keller |
| 5,873,429 A | 2/1999 | Qutub |
| 5,957,495 A | 9/1999 | Korpi |
| 2004/0098978 A1 | 5/2004 | Tarabulski |
| 2008/0142647 A1 | 6/2008 | Connelly et al. |

FOREIGN PATENT DOCUMENTS

| | | |
|---|---|---|
| GB | 2228239 A | 8/1990 |
| JP | 4393510 | 12/1992 |
| WO | 2006/033608 A1 | 3/2006 |

OTHER PUBLICATIONS

Examination report for corresponding Australia patent application No. 2009343178 dated Mar. 28, 2014.

*Primary Examiner* — Gwendolyn W Baxter
(74) *Attorney, Agent, or Firm* — Volvo Group Intellectual Property; Michael Pruden; Martin Farrell

(57) ABSTRACT

A mounting arrangement for a vertically oriented exhaust system component includes a base member mountable to a vehicle frame with a plurality of upstanding rods fixed to the base member. At least one clamping band is interconnected with the plurality of rods and can be clamped onto an exhaust component. The arrangement is advantageous for heavy components such as SCR catalyst bodies and diesel particulate filters.

24 Claims, 4 Drawing Sheets

SUPPORT FOR VERTICALLY MOUNTED EXHAUST COMPONENTS

FIELD OF THE INVENTION

The invention relates to mounting structures for exhaust components on vehicles, such as heavy trucks, that are mounted in a vertical orientation. More specifically, the invention relates to an apparatus for mounting and supporting vertical exhaust components, such as SCR catalyst bodies and diesel particulate filters, in a free-standing manner, that is, without a connection to the vehicle cab.

BACKGROUND AND SUMMARY OF THE INVENTION

To conserve space on the frame of a heavy truck, it is desirable to mount some vehicle components vertically, that is, rising from the frame, rather than hanging horizontally along the frame. Of interest are exhaust components, such as diesel particulate filters and selective catalytic reduction catalyst bodies, which can be integrated with the commonly used vertical exhaust stack. A number of conventional arrangements for mounting vertical exhaust components, such as stacks and mufflers, rely on a bracket connecting to the vehicle cab for horizontal support. This connection can transmit vibration from the exhaust component to the cab, becoming a source of noise and vibration to the driver.

The instant invention provides a mounting support for an exhaust component that eliminates the need for a brace or bracket attaching to the cab.

The mounting support of the invention provides a framework that integrates with the exhaust component to support it in a vertical orientation. The framework surrounds the exhaust component, and advantageously can react to and accommodate various forces imposed on the exhaust component by movement of the vehicle. In particular, the framework of the invention provides a support that can resist torsional loading on the exhaust component. By comparison, in a support relying on a single vertical support, such as a stanchion, the exhaust component has the tendency to rotate about the stanchion under lateral force loads.

According to an embodiment of the invention, an apparatus for supporting vertically-oriented exhaust components on a vehicle includes a base mountable on a vehicle frame, a plurality of rods fixed to the base and extending upward therefrom, the rods arranged to define an exhaust component mounting position perimeter, and, means for interconnecting the rods to an exhaust component.

According to one embodiment, means for interconnecting the rods to an exhaust component includes at least one ring interconnected to the plurality of rods and configured for securing an exhaust component. The at least one ring preferably includes means, such as a T-nut, turnbuckle or similar tensioning device, for tensioning the ring to apply a clamping force on an exhaust component.

According to an alternative embodiment, means for interconnecting the plurality of rods to an exhaust component include an equal plurality of bosses, each having an eye or a sleeve to receive a rod and each being mountable on an exhaust component, by welding or other method.

According to yet another alternative, the plurality of bosses are mountable on the interior of the exhaust component outer wall and integrated with bulkheads or compartment dividing structures.

According to another aspect of the invention, the base includes a horizontal support having a central aperture, the plurality of rods being fixed to the horizontal support about the aperture. The central aperture is sufficiently large to allow an exhaust pipe to pass through the base and connect to the exhaust component.

According to the invention, the base is supported on the vehicle frame, and includes at least one bracket for attachment to the vehicle frame.

The apparatus of the invention may preferably include two or three rings. The rings each include a band having sleeves to accept the rods. Lugs are fixed, by welding or another suitable method, to each of the rods, the sleeves engaging the lugs so that the at least one ring is vertically supported on the lugs. According to the invention, the sleeves are sized to allow rotation on the rods to accommodate small movements and vibration of the exhaust component.

To allow for thermal expansion of the exhaust component, an upper ring is interconnected to the plurality of rods by sleeves slidably engaging the rods. The upper ring, supported from beneath by the lugs, may slide upwardly on the rods as the exhaust component expands under heating.

According to a preferred embodiment of the invention, the plurality of rods comprises at least two rods, and preferably, four rods, although a greater number may be used.

Preferably, the at least one ring supports an exhaust component on the rods and above the base.

According to another embodiment, one or more ribs are fixed to the plurality of rods, the ribs providing supports to which a heat shield may be mounted.

BRIEF DESCRIPTION OF THE DRAWINGS

The invention will be better understood with reference to the following detailed description read in conjunction with the appended drawings, in which.

DETAILED DESCRIPTION

Figure 1:
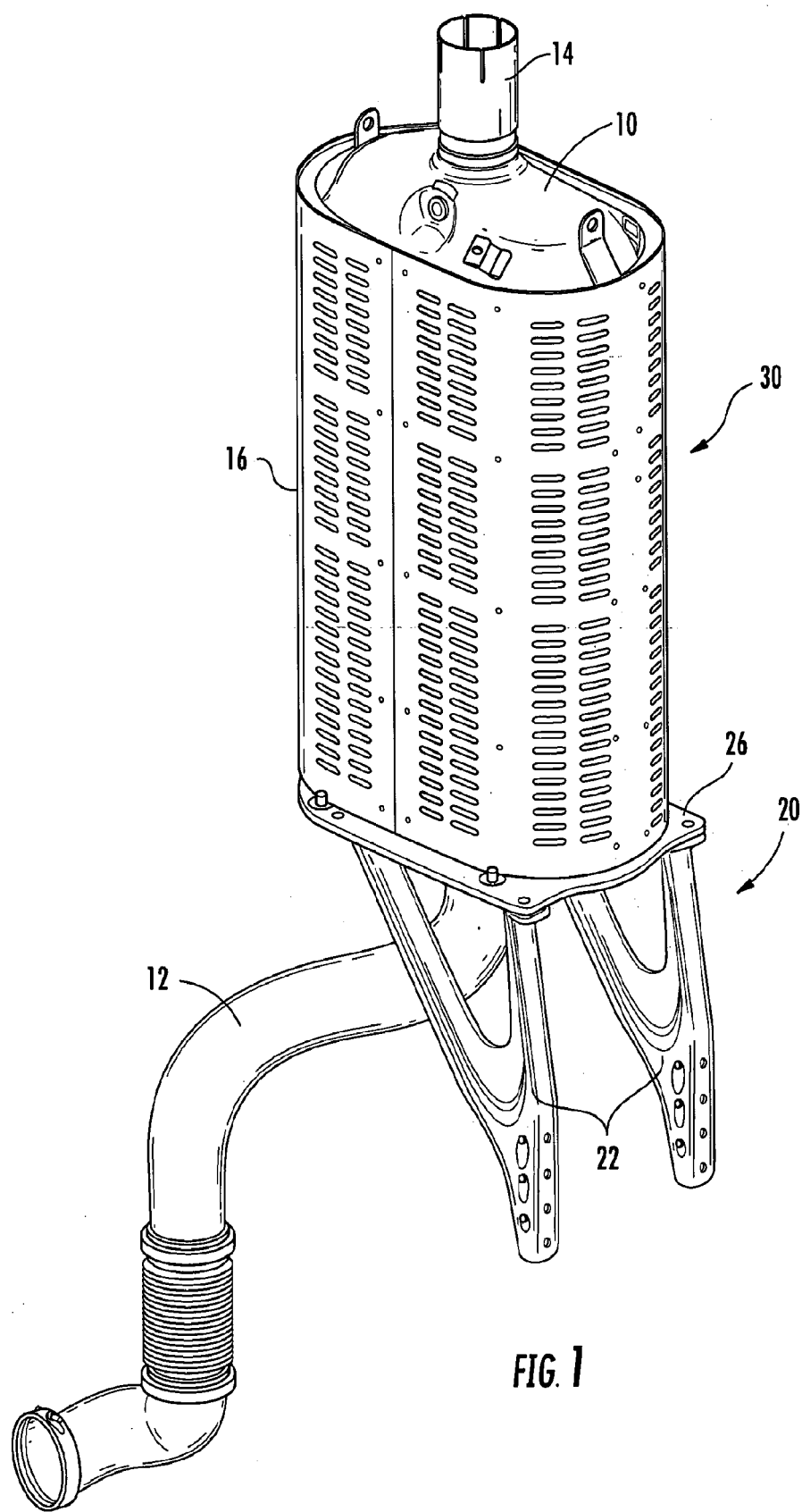
FIG. 1 is a perspective view of an embodiment of a mounting arrangement in accordance with the invention.

FIG. 1 is a perspective view of an illustrative embodiment of a mounting arrangement of the invention. An SCR unit 10 has an exhaust conduit 12 connected at a bottom end to deliver exhaust gas from the engine to the SCR unit for treatment, and has an outlet 14 to direct treated exhaust gas to the atmosphere. Typically, a stack tube is placed on the outlet 14 to carry the exhaust to an acceptable location for dispersion of the exhaust gas to the atmosphere.

The supporting and mounting structure of the invention includes a base 20 that is mountable on a vehicle frame (not illustrated) and a framework 30 that supports the exhaust component or components. In the illustrated embodiment, by way of example, an SCR unit 10 is shown as the exhaust component. A heat shield 16 is mounted on and surrounds the framework 30. The base 20 includes two brackets 22 that are mountable on a vehicle frame rail (not shown) and a platform 26 fixed to the brackets that provides a horizontal supporting surface. The base 20 is described in greater detail in connection with FIG. 5.

Figure 2:
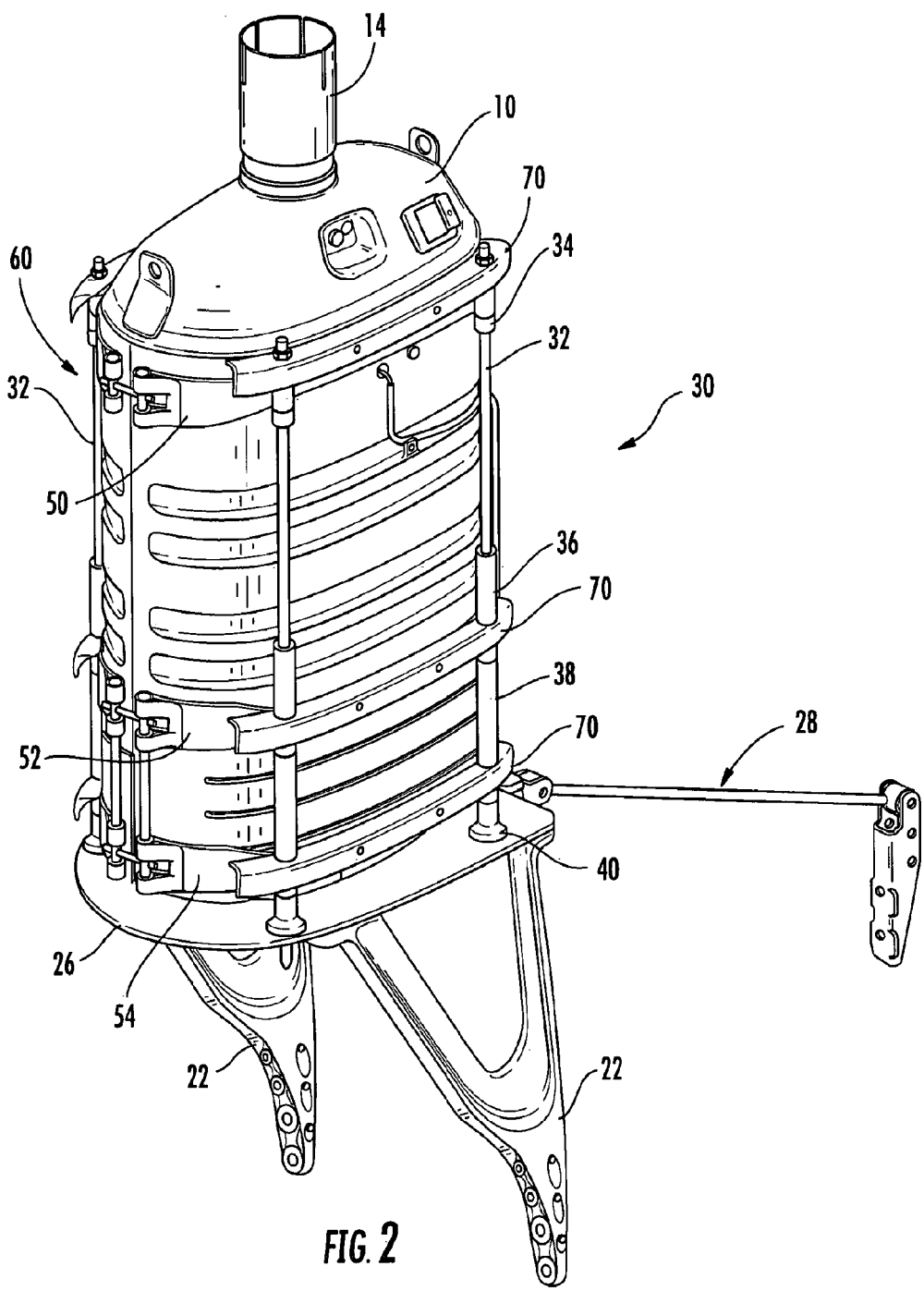
FIG. 2 is a perspective view of the arrangement shown in FIG. 1 with a heat shield removed.
Figure 3:
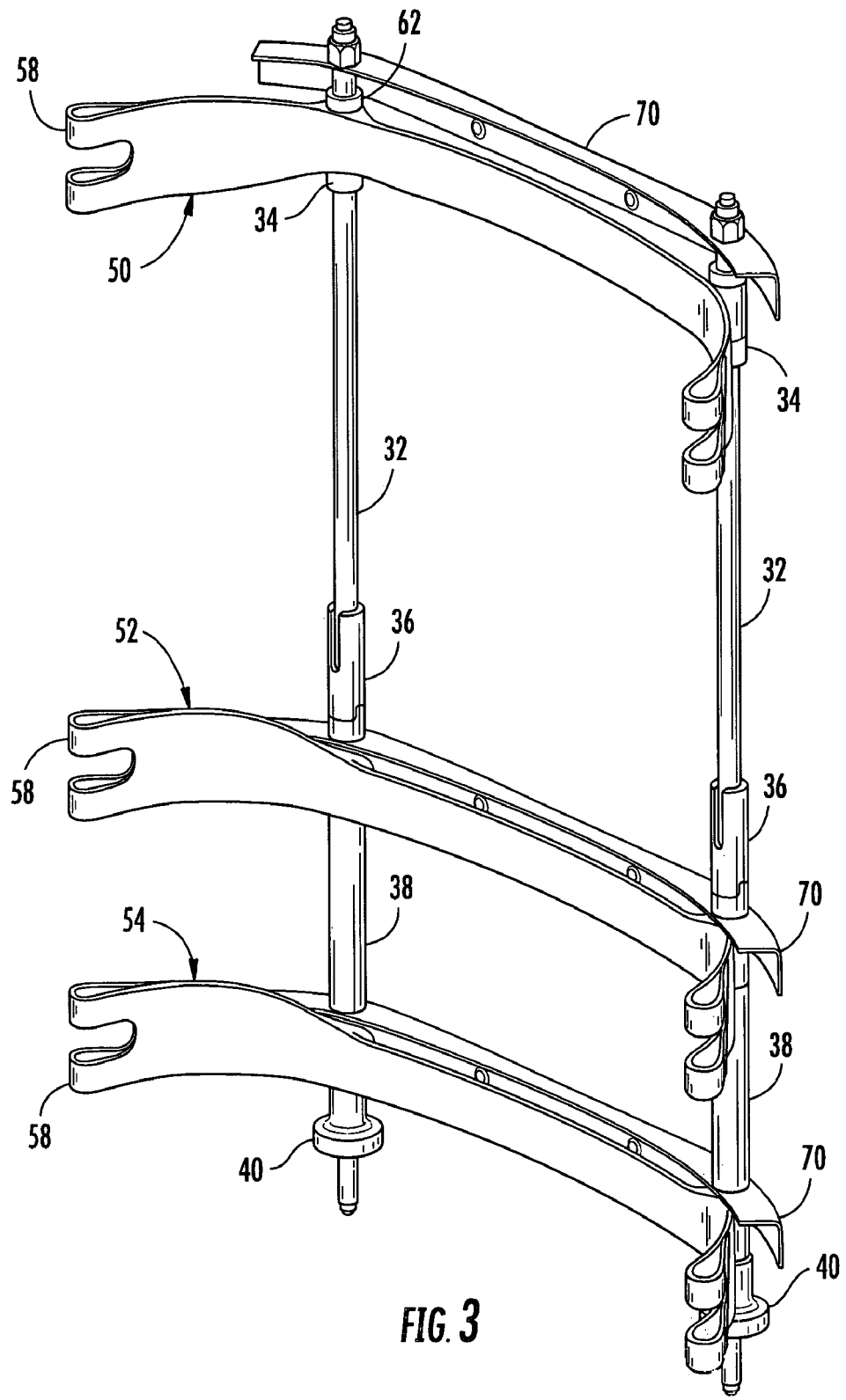
FIG. 3 is a perspective view of a portion of the support apparatus shown removed from the supported exhaust component.

Referring now to FIG. 2 and FIG. 3, the framework 30 includes a plurality of rods 32 fixed to the platform 26 and standing vertically upward from the platform. The rods 32 are mutually spaced to define the perimeter of a mounting space for the exhaust component 10. In the illustrated embodiment, four rods 32 are shown. For exhaust components of lower weight and/or smaller outer diameter, three or two rods may be sufficient if the load forces are properly balanced. Conversely, for large units, five or more rods may be used.

Figure 4:
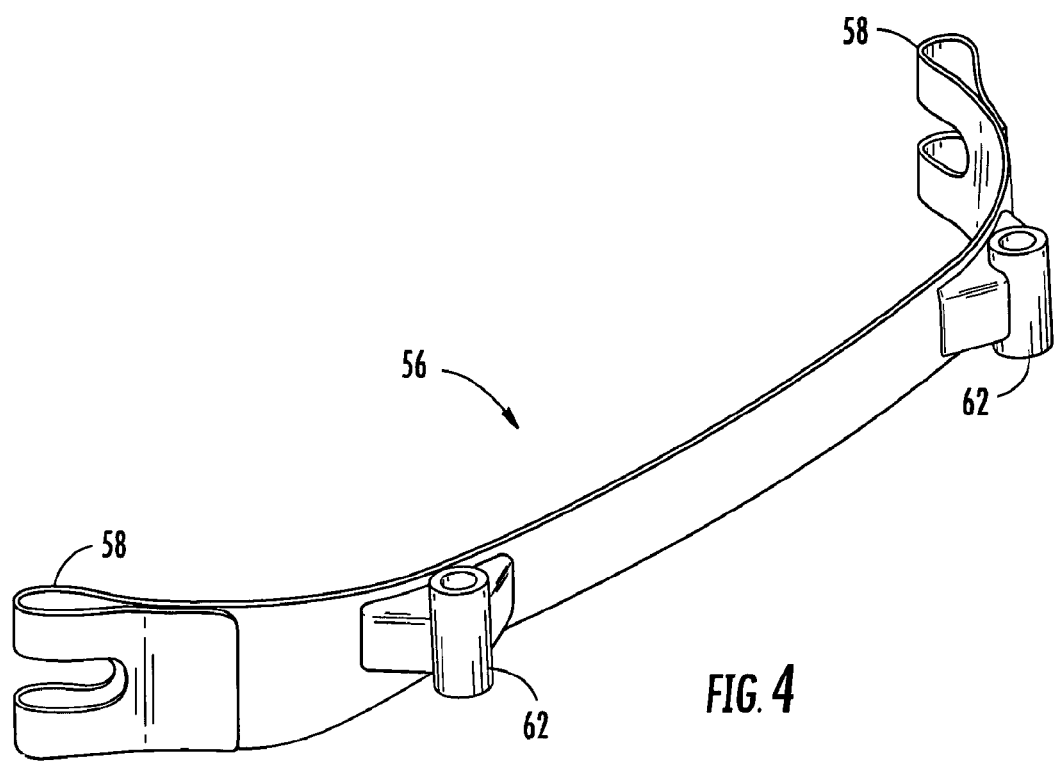
FIG. 4 is a view of a part of a ring device for securing an exhaust component; and, FIG. 5 is a perspective view of a base portion of the mounting arrangement.

The rods 32 are interconnected by the rings 50, 52, and 54, which may be best seen in FIG. 3 and FIG. 4. The embodiment of the invention shown in FIGS. 2 and 3 includes an upper ring 50 and two rings 52 and 54 forming a lower ring assembly.

The rods 32 each include an upper lug 34 located near a top end of the rod for locating and supporting an upper ring 50. Each rod 32 also includes a lower lug 36 located a distance above the lower end of the rod for locating the lower ring assembly, shown in the illustrated embodiment as rings 52 and 54. The rods 32 extend through the platform 26 and are fixed to the platform 26 by fasteners (not shown). For convenience, the ends of the rods 32 extending through the platform 26 are threaded to engage internally threaded fasteners such as nuts. Each rod 32 has a standoff 38 and a foot 40. The standoff 38 spaces the middle ring 52 from lower ring 54, and the foot 40 supports lower ring 54 above the platform 26. When the fastener on the rod 32 is tightened, tension is applied to the foot 40, standoff 38 and rings 52 and 54 against the lower lug 36 to secure the assembly on the rod.

As shown in FIGS. 3 and 4, the rings 50, 52, and 54 may conveniently be formed as bands or straps, which can be positioned in contact with the exhaust component 10 and tightened against it to secure the exhaust component to the framework 30. Referring to FIG. 2, each band is formed in two parts, which can be conveniently placed on the exhaust component 10 and tightened on the component. Alternatively, the band may be formed in a single piece and have loops at the free ends.

FIG. 4 shows a band part 56, which is exemplary of the bands. The band part 56 terminates in loops 58 which accept the tensioning device 60 (seen in FIG. 2) that connects the band parts and provides tension to the band. Each band part 56 also includes a sleeve 62, a tubular member fixed to the band in a suitable manner by welding, for example, that receives the rod for positioning the band on the rod. The sleeves 62 have an inner diameter slightly larger than the outer diameter of the rods 32 so that relative rotation and sliding movement is allowed.

The tensioning device 60 may be a T-bolt device, a turnbuckle device or other suitable device, as will be understood by those skilled in the art. Devices other than bands may be used for the rings, for example, curved rods or other elements capable of applying a clamping tension to the exhaust component.

Referring again to FIGS. 2 and 3, as mentioned, lugs 34, 36 are formed or fixed to the rods to locate and support the sleeves 62 and, accordingly, the rings 32 on the rods. The lugs 34, 36 are tubular members that are fixed on the rods 32, by welding or other suitable method, at the desired height position. The lugs 34, 36 have an outer diameter equal to or greater than the outer diameter of the sleeves 62 to provide a supporting surface on which the sleeves 62 of the upper ring 50 rest and against which the sleeves 62 of the ring 52 (which is the upper of the lower ring assembly) is compressed. The upper ring 50 may be unconstrained vertically upward and allowed to move upward on the rods 32 to accommodate thermal expansion and contraction of the exhaust component 10. To prevent vertical movement of the exhaust component from vehicle movement induced forces, at least the lower ring assembly is constrained from vertical movement by the assembly of the lower lug 36, standoff 38 and foot 40, with the tension provided by the rod fastener.

The framework 30 may include one or more ribs 70. The ribs 70 are formed from angled metal sheet curved to follow the outer contour of the exhaust component 10. Each rib 70 in the embodiment of FIGS. 2 and 3 extends for about half the circumference of the exhaust component 10 and is connected to two rods. The ribs 70 receive the rods through holes provided in the ribs. The ribs 70 are arranged in pairs, each pair corresponding to a ring band 50, 52, and 54. In FIG. 2, three sets of ribs 70 are illustrated. Referring to FIG. 1, the ribs 70 support the heat shield 16, which may be secured to the ribs by threaded fasteners secured to threaded holes formed in the ribs.

Figure 5:
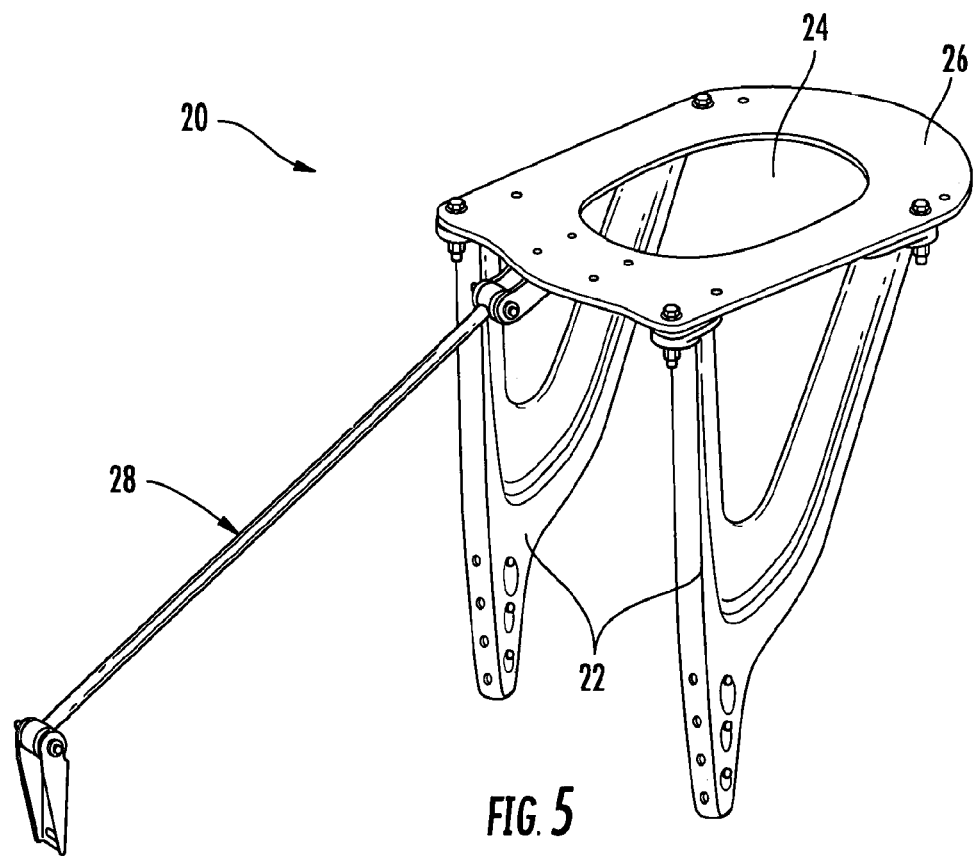

Turning now to FIG. 5, the base 20 includes, as mentioned above, brackets 22 for mounting the base on a vehicle frame rail (not illustrated). The brackets 22 support a platform 26 that provides a horizontal supporting surface. The platform 26 includes a centrally located aperture or hole 24, that allows passage through the platform 26 of an exhaust pipe 12 (seen in FIG. 1) to connect to the exhaust component 10.

If needed to stabilize the base 20, a stay 28 may be connected between the platform 26 and an opposite frame rail of the vehicle frame (not illustrated).

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An apparatus for supporting vertically-oriented exhaust components on a vehicle, comprising:
   a base mountable on a vehicle frame;
   a plurality of rods fixed to the base and extending upward therefrom, the rods arranged on a perimeter surrounding and defining an exhaust component mounting position; and
   means for interconnecting the plurality of rods to an exhaust component.

2. The apparatus of claim 1, wherein the base includes a horizontal support having a central aperture, the plurality of rods being fixed to the horizontal support about the aperture.

3. The apparatus of claim 1, wherein the base further comprises at least one bracket for attachment to the vehicle frame.

4. The apparatus of claim 1, wherein the means for interconnecting the plurality of rods to an exhaust component includes at least one ring interconnected to the plurality of rods and configured to encircle the exhaust component.

5. The apparatus of claim 4, wherein the at least one ring includes means for tensioning the ring to apply a clamping force on the exhaust component.

6. The apparatus of claim 4, wherein the at least one ring comprises two rings.

7. The apparatus of claim 6, wherein an upper ring is interconnected to the plurality of rods by sleeves slidably engaging the rods.

8. The apparatus of claim 4, further comprising lugs fixed to each of the rods, the at least one ring being vertically supported on the lugs.

9. The apparatus of claim 4, wherein the at least one ring comprises a band having sleeves to accept the rods.

10. The apparatus of claim 9, further comprising lugs fixed to each of the rods, the sleeves of the at least one ring being vertically supported on the lugs.

11. The apparatus of claim 9, wherein the sleeves are sized to allow rotation on the rods.

12. The apparatus of claim 1, wherein said means for interconnecting the plurality of rods to an exhaust component is configured to support the exhaust component above the base.

13. The apparatus of claim 1, further comprising at least one rib member fixed to the plurality of rods.

14. The apparatus of claim 1, wherein the plurality of rods comprises at least three rods.

15. The apparatus of claim 14, wherein the plurality of rods comprises at least four rods.

16. A vehicle vertically-oriented exhaust component and support, comprising:
   a base mountable on a vehicle frame;
   a plurality of rods fixed to the base and extending upward therefrom, the rods arranged to surround and define an exhaust component mounting position;
   an exhaust component disposed in the exhaust component mounting position; and
   at least one ring interconnected to the plurality of rods and securing the exhaust component above the base.

17. The apparatus of claim 16, wherein the base includes a horizontal support having a central aperture, the plurality of rods being fixed to the horizontal support about the aperture.

18. The apparatus of claim 16, wherein the at least one ring includes means for tensioning the ring to apply a clamping force on the exhaust component.

19. The apparatus of claim 16, wherein the at least one ring comprises two rings, and wherein an upper ring is interconnected to the plurality of rods by sleeves slidably engaging the rods.

20. The apparatus of claim 16, further comprising lugs fixed to each of the rods, the at least one ring being vertically supported on the lugs.

21. The apparatus of claim 16, wherein the at least one ring comprises sleeves to accept the rods.

22. The apparatus of claim 21, further comprising lugs fixed to each of the rods, the sleeves of the at least one ring being vertically supported on the lugs.

23. The apparatus of claim 21, wherein the sleeves are sized to allow rotation on the rods.

24. The apparatus of claim 16, further comprising a rib member fixed to the plurality of rods.

\* \* \* \* \*